(12) United States Patent
Hashimoto et al.

(10) Patent No.: US 8,267,560 B2
(45) Date of Patent: Sep. 18, 2012

(54) COMBINATION LAMP ATTACHMENT STRUCTURE

(75) Inventors: Hidenao Hashimoto, Kanagawa (JP); Masaji Takei, Kanagawa (JP); Hiromi Takei, legal representative, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 514 days.

(21) Appl. No.: 12/514,481

(22) PCT Filed: Nov. 12, 2007

(86) PCT No.: PCT/JP2007/071897
§ 371 (c)(1), (2), (4) Date: Feb. 23, 2010

(87) PCT Pub. No.: WO2008/059785
PCT Pub. Date: May 22, 2008

(65) Prior Publication Data
US 2010/0195347 A1 Aug. 5, 2010

(30) Foreign Application Priority Data
Nov. 13, 2006 (JP) .................................. 2006-307084

(51) Int. Cl.
*B60Q 1/00* (2006.01)
(52) U.S. Cl. ......... 362/523; 362/549; 362/512; 362/455
(58) Field of Classification Search .................. 362/523, 362/549, 546, 548, 544, 509, 512, 459, 277, 362/285, 368, 370, 374, 375, 433, 457, 455
See application file for complete search history.

(56) References Cited

U.S. PATENT DOCUMENTS

| | | | | |
|---|---|---|---|---|
| 4,825,342 A * | 4/1989 | Gorski | ........................... | 362/549 |
| 5,209,558 A * | 5/1993 | Suzuki et al. | .................. | 362/538 |
| 5,702,174 A * | 12/1997 | Dobler | ........................... | 362/496 |
| 5,765,942 A * | 6/1998 | Shirai et al. | .................... | 362/267 |
| 7,581,861 B2 * | 9/2009 | Gomez Ramirez et al. | .. | 362/549 |
| 2001/0040811 A1 * | 11/2001 | Chase et al. | .................. | 362/546 |

FOREIGN PATENT DOCUMENTS

| | | | |
|---|---|---|---|
| JP | 4-11148 A | 1/1992 |
| JP | 4-51841 A | 4/1992 |
| JP | 6-71291 A | 10/1994 |
| JP | 07-315120 A | 12/1995 |
| JP | 11-115624 A | 4/1999 |

* cited by examiner

Primary Examiner — Bao Q Truong (57) ABSTRACT

A combination lamp body 10, which are attached with a combination lamp, is arranged in a position adjacent to headlamp bodies 50, and includes a shaft provided on the outer end in the vehicle width direction. A support provided to each of the headlamp bodies 50 regulates inward and forward movements of the shaft in the vehicle width direction. An engagement part is fixed to the vehicle body. An attachment member 20 is provided removable from the rear face of the combination lamp body 10, and includes a locking part 21 engaging with the engagement part. While the outer ends of the combination lamp body 10 are rotated and moved toward the rear centered around the shaft 14, which is regulated in movement by the support 53, and the combination lamp body 10 reaches a predetermined position, the support regulates inward and forward movements of the combination lamp body 10 in the vehicle width direction, and the engagement part engages with the locking part 21 to regulate outward and backward movements of the combination lamp body 10 in the vehicle width direction.

2 Claims, 6 Drawing Sheets

COMBINATION LAMP ATTACHMENT STRUCTURE

TECHNICAL FIELD

The present invention relates to an attachment structure for a vehicle combination lamp.

BACKGROUND ART

An attachment structure for small lamps arranged on the outer sides of vehicle headlamps along the vehicle width is disclosed in Japanese Unexamined Patent Application Publication No. Hei 7-315120. A small lamp body to which the small lamps are attached includes a pivot component. The small lamp body to which the headlamps are attached includes a lamp housing. A retainer holding the pivot component is attached to the lamp housing by a screw, and moves when a force is exerted in a predetermined direction. The small lamp body is attached to the lamp housing by a screw and the pivot component.

Patent Document 1: JP-A 7-315120

DISCLOSURE OF INVENTION

Problem to be Solved by the Invention

Be that as it may, in view of exchange workability of the lamps attached inside of the lamp body and exchange workability of a damaged lamp body component, the simplest attaching operation for the lamp body to a vehicle is desired. However, mere simplification of the attaching operation may lead to reduction in attachment precision.

Moreover, with the above-given conventional structure, the attaching operation is complicated since the retainer and the small lamp body are fixed to the lamp housing by screws. Furthermore, movement of the retainer leads to reduction of attachment precision and variation in attaching positions of the small lamp bodies to vehicles.

Therefore, the present invention aims to provide a combination lamp attachment structure having favorable attachment precision and favorable attachment workability.

Means of Solving the Problem

In order to achieve the above-mentioned objective, the present invention is an attachment structure for a combination lamp attachable at a predetermined position on the outer side of a pair of headlamps, which is arranged on the both sides of a vehicle body in the vehicle width direction, in the vehicle width direction. It includes headlamp bodies, a combination lamp body, a shaft, a support, a first engagement part, and an attachment member.

The headlamp bodies are attached with the headlamps and attachable to the vehicle body. The combination lamp body is arranged adjacent to the headlamp bodies and attached with the combination lamp. The shaft is provided either on an outer end of the headlamp bodies in the vehicle width direction or an inner end of the combination lamp body in the vehicle width direction. The support is provided on either the other outer end of the headlamp bodies in the vehicle width direction or the other inner end of the combination lamp body in the vehicle width direction, and regulates inward and forward movements of the shaft in the vehicle width direction. The first engagement part is fixed to the vehicle body. The attachment member is provided removable from the rear face of the combination lamp body and includes a second engagement part that engages with the first engagement part.

While the outer ends of the combination lamp body are rotated and moved toward the rear centered around the shaft, which is regulated in movement by the support, and the combination lamp body reaches the predetermined position, the support regulates inward and forward movements of the combination lamp body in the vehicle width direction, and the first engagement part engages with the second engagement part to regulate outward and backward movements of the combination lamp body in the vehicle width direction.

With this structure, since the support is provided on the other outer end of the headlamp bodies in the vehicle width direction or the other inner end of the combination lamp body in the vehicle width direction, and regulates inward and forward movements of the shaft in the vehicle width direction, the outer end of the combination lamp body may be rotated and moved in the vehicle width direction centered around the shaft.

When attaching the combination body to the vehicle body, the outer end of the combination lamp body is rotated and moved centered around the shaft, which is regulated in inward and forward movements in the vehicle width direction by the support. When the outer end of the combination lamp body reaches a predetermined position in the vehicle width direction, the first engagement part fixed to the vehicle body and the second engagement part of the attachment member are engaged.

With this structure, just by rotating and moving the combination lamp body centered around the shaft, engaging the first engagement part is engaged to the second engagement part without particular necessity of positioning, and thus the combination lamp body can be attached at a predetermined position of the vehicle body. As a result, the combination lamp body may be easily attached.

Moreover, the combination lamp body is positioned by the support restricting its inward and forward movements along the vehicle width regulated and restricting its outward and backward movements along the vehicle width by the engagement of the first engagement part and the second engagement part. As a result, variation in attaching position of the combination lamp body does not occur often, thereby providing satisfactory attachment precision.

Furthermore, since positioning the inner side and front of the combination lamp body in the vehicle width direction within the inner side along the vehicle width adjacent to the headlamp bodies is carried out, difference in outer edge position of the combination lamp lens relative to the headlamp lens does not occur often, and thus the external appearance remains attractive.

Yet furthermore, since the attachment member is provided removable from the combination lamp body, removal of the attachment member from the combination lamp body allows removal of the combination lamp body from the vehicle body.

Yet even further, since the attachment member is provided removable from the combination lamp body, the combination lamp body removed from the vehicle body may be reattached to the vehicle body. Namely, the combination lamp body may be reattached by rotating and moving the outer end of the combination lamp body in the vehicle width direction centered around the shaft, and attaching the attachment member to the combination lamp body at a predetermined position.

Alternatively, either of the first or the second engagement part may include an engaging region and an engagement release region. The engaging region engages with the other of the first or the second engagement part when the attachment member is rotated and moved in a predetermined direction centered around the shaft. The engagement release region allows movement of the other engagement part from the engaging region due to movement of the attachment member in a direction intersecting with the predetermined direction, and allows disengagement of the other engagement part from the one engagement part.

With this structure, the other engagement part of the first and the second engagement part engages with the engaging region of the one engagement part when the attachment member is rotated and moved in a predetermined direction centered around the shaft. Moreover, the other engagement part allows disengagement from the one engagement part due to movement of the attachment member in a direction intersecting with the predetermined direction to move from the engaging region to the engagement release region.

If the attachment member is removed from the combination lamp body in order to remove the combination lamp body from the vehicle body, the attachment member may be removed from the first engagement part by allowing movement of the other engagement part from the engaging region to the engagement release region. Therefore, the attachment member removed once from the combination lamp body may be easily reattached to the combination lamp body, and when reattaching the combination lamp body, it may be attached to the vehicle body through the same procedure as when first attaching it thereto. In other words, just by rotating and moving the combination lamp body centered around the shaft, the first engagement part and the second engagement part may be engaged without particular necessity of positioning, and the combination lamp body may be easily reattached in the same manner as when first attaching it thereto.

Moreover, burden on the first and the second engagement part when removing the combination lamp body from the vehicle body may be suppressed to a minimum, and decrease in durability of the first and the second engagement part may be prevented.

EFFECT OF THE INVENTION

According to the present invention, both attachment precision and attachment workability are favorable.

DESCRIPTION OF REFERENCE NUMERALS

1 Vehicle
2 Vehicle body
10 Combination lamp body
11 Combination lamp rear face
12 Socket
13 Shaft arm
14 Shaft
15 Combination lamp lens
16 Nut
20 Attaching member
21 Locking part (second engagement part)
22 Locking part
23 Square column
24 Front end
25 Locking claw
26 Attaching section
27 Screw hole
28 Attaching screw
29 Screw shaft
30 Screw head
40 Bracket
41 Engagement part (first engagement part)
42 Engaging hole (engaging region)
43 Through-hole (engagement release region)
44 Headlamp body stationary portion
50 Headlamp body
51 Headlamp rear face
52 Socket
53 Support
54 First regulating portion
55 Second regulating portion
56 Guide piece
57 Guiding portion
58 Headlamp lens
59 Bracket joint

BEST MODE FOR CARRYING OUT THE INVENTION

Figure 1:
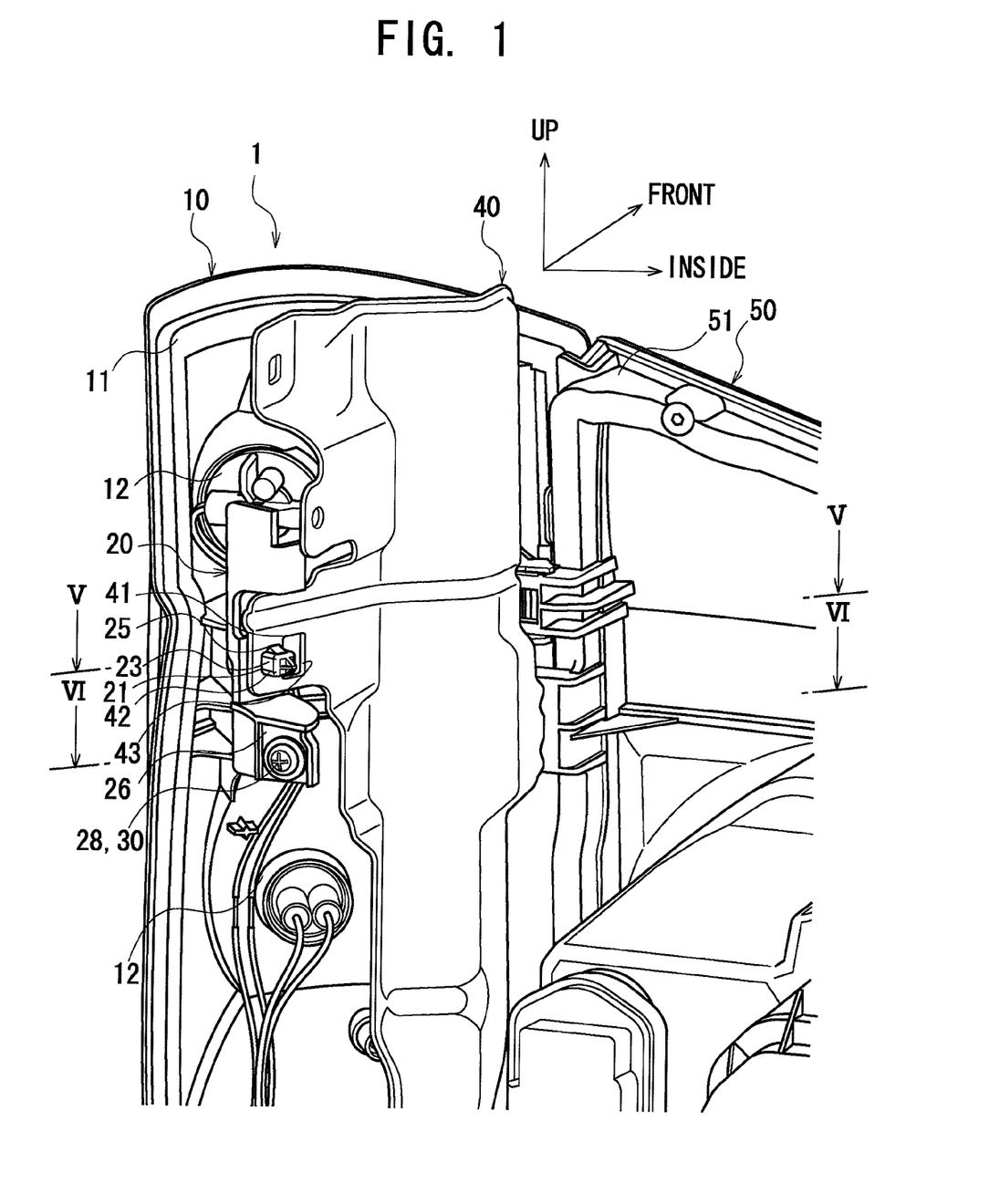
FIG. 1 is a perspective view of an attachment structure for a combination lamp according to an embodiment when viewed from the rear.
Figure 2:
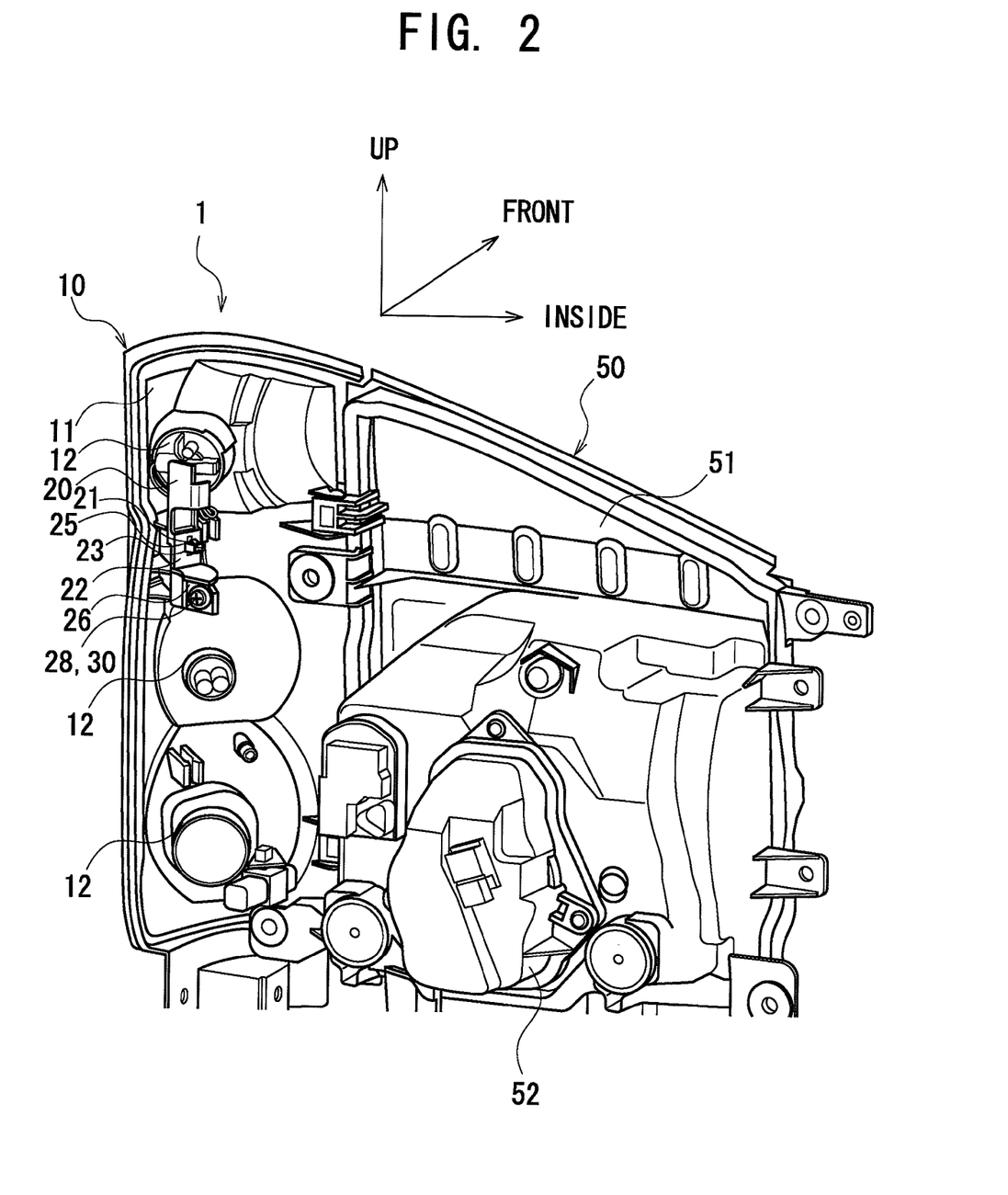
FIG. 2 is a perspective view of the state that a bracket for the combination lamp according to the embodiment is removed when viewed from the rear.
Figure 3:
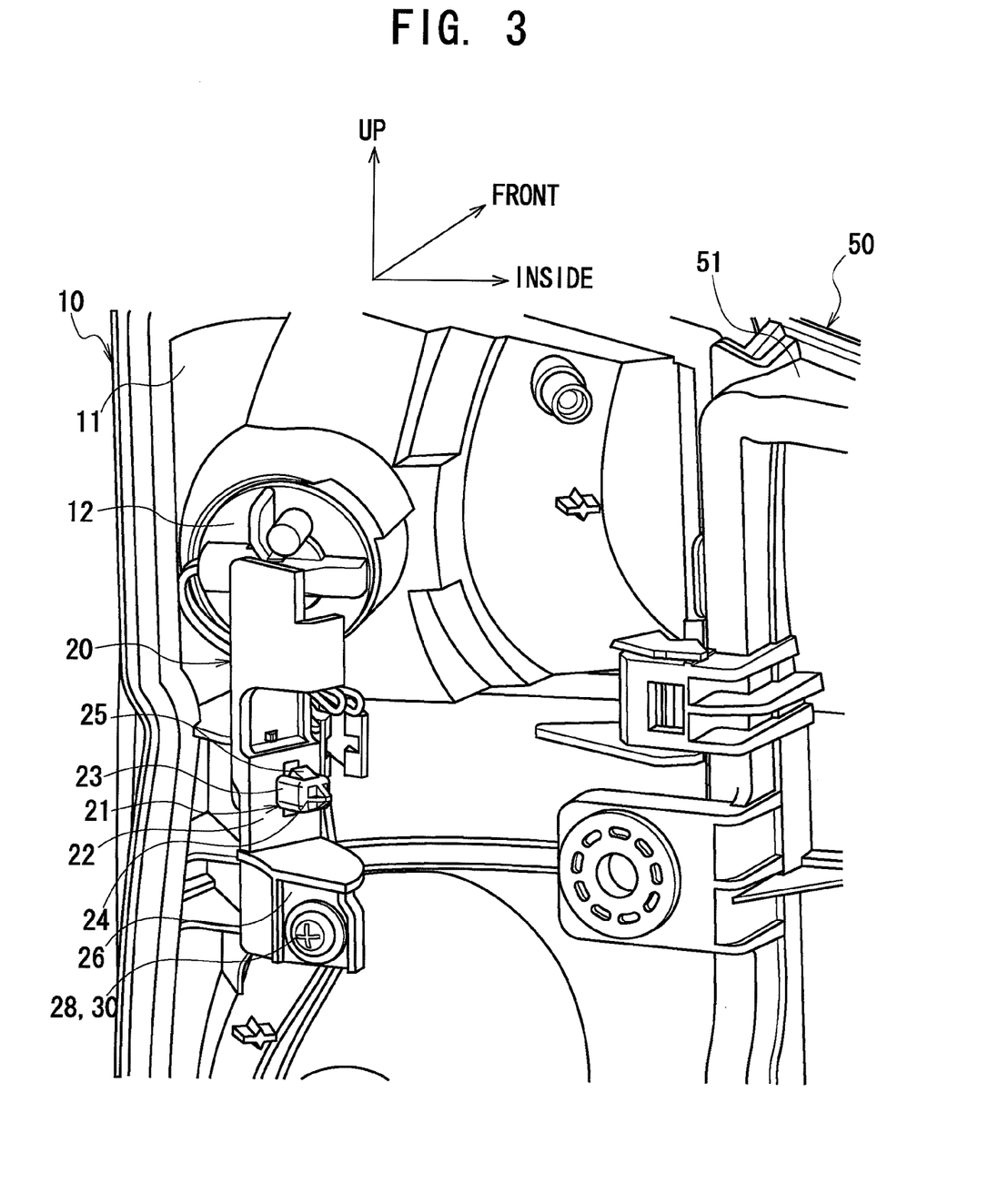
FIG. 3 is an enlarged view of principal parts of FIG. 2.
Figure 4:
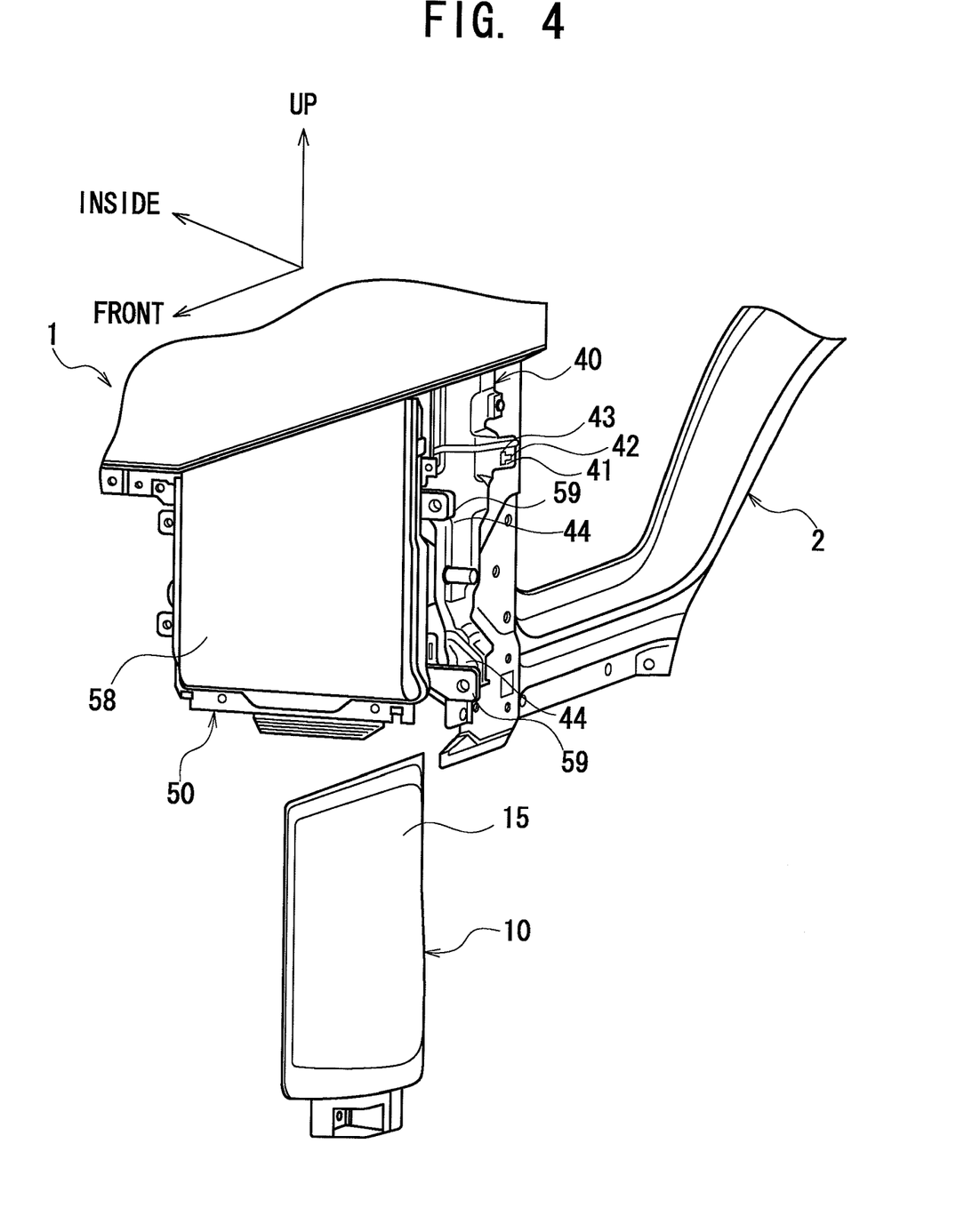
FIG. 4 is a perspective view of the state that a combination lamp body of the combination lamp according to the embodiment is not attached yet when viewed from the front.
Figure 5:
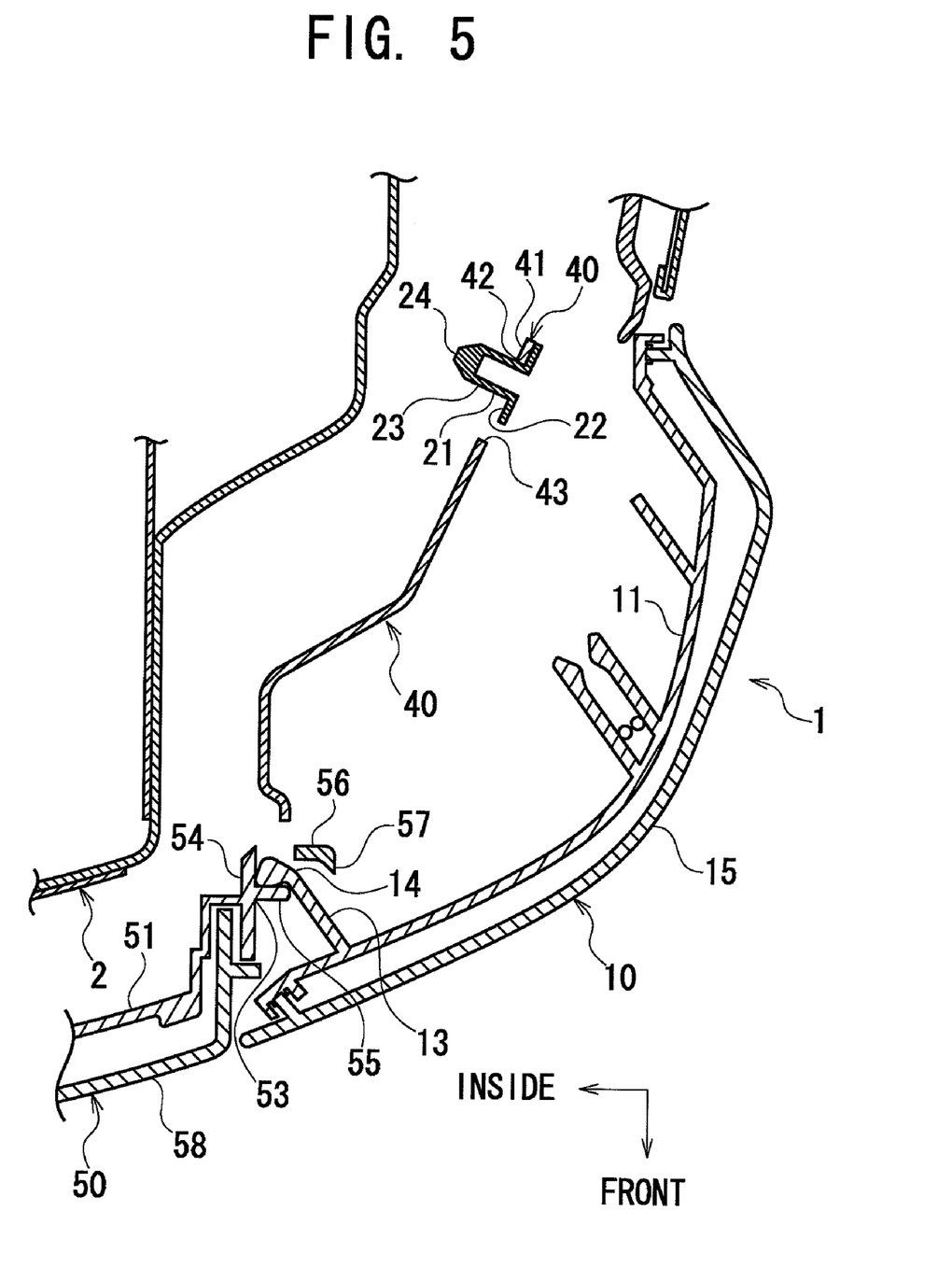
FIG. 5 is a cross section cut along line V-V of FIG. 1.
Figure 6:
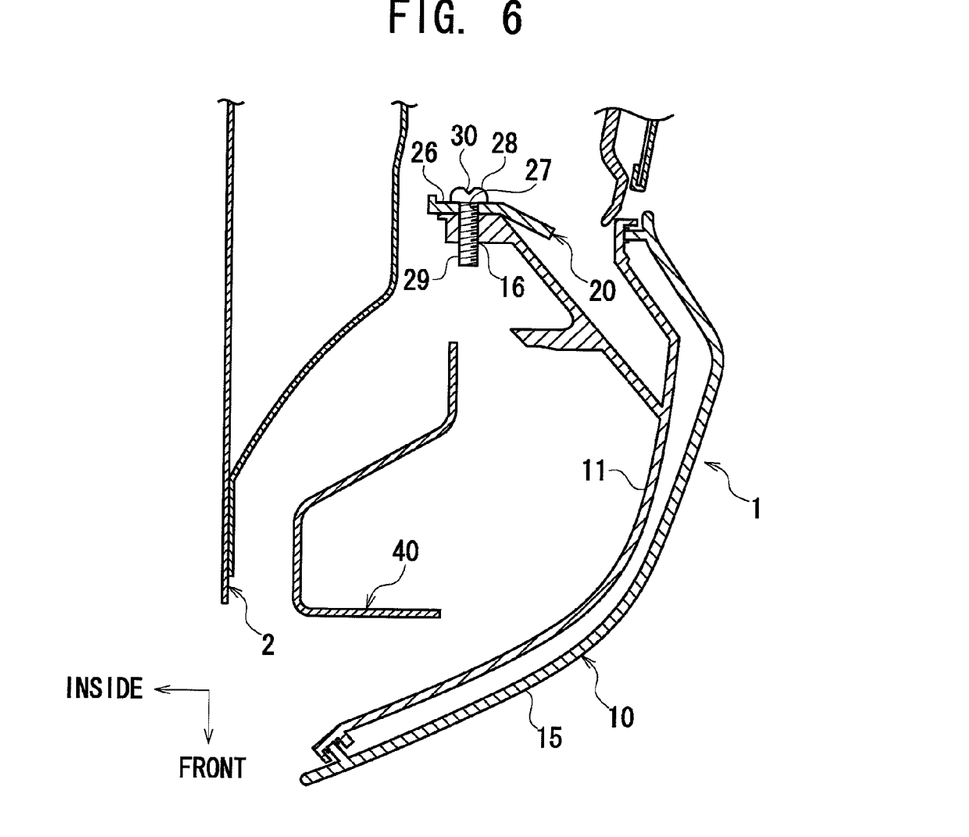
FIG. 6 is a cross section cut along line VI-VI of FIG. 1.
Figure 7:
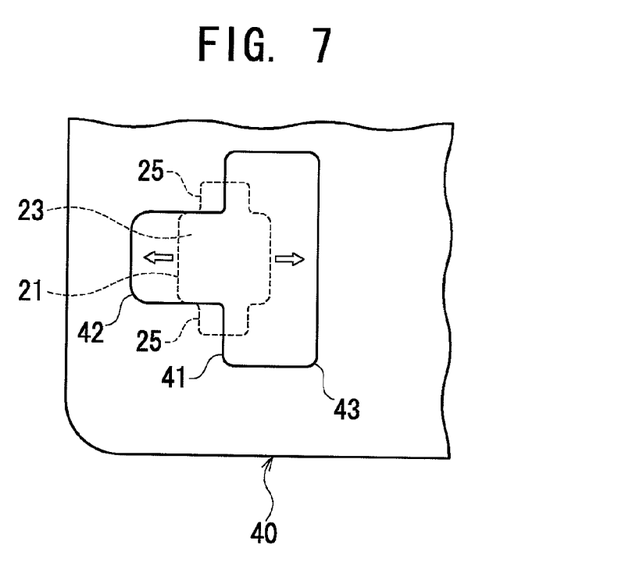
FIG. 7 is a front view of an engagement part of the bracket.

Hereafter, an embodiment according to the present invention is described. FIG. 1 is a perspective view of an attachment structure for a combination lamp according to an embodiment when viewed from the rear. FIG. 2 is a perspective view of the state that a bracket for the combination lamp according to the embodiment is removed when viewed from the rear. FIG. 3 is an enlarged view of principal parts of FIG. 2. FIG. 4 is a perspective view of the state that a combination lamp body of the combination lamp according to the embodiment is not attached yet when viewed from the front. FIG. 5 is a cross section cut along line V-V of FIG. 1. FIG. 6 is a cross section cut along line VI-VI of FIG. 1. FIG. 7 is a front view of an engagement part of the bracket. Front-back direction hereafter means front-back direction in the vehicle traveling direction. Moreover, 'UP' in the drawings denotes vehicle top, 'FRONT' denotes vehicle front, and 'INSIDE' denotes vehicle interior.

As shown in FIGS. 1 through 7, a vehicle body 2 of a vehicle 1 according to this embodiment includes a pair of headlamp bodies 50 deployed on either side in the vehicle width direction, a combination lamp body 10 deployed on the outer sides of the pair of headlamp bodies 50 in the vehicle width direction, an attachment member 20, and a bracket 40.

The combination lamp body 10 includes a combination lamp rear face 11, a combination lamp (omitted from the drawings), a shaft arm 13, a shaft 14, a combination lamp lens 15, and a nut 16. A combination lamp socket 12 is integratedly formed on the combination lamp rear face 11, which constitutes the rear face of the combination lamp body 10. The combination lamp is attached to the socket 12 on the combination lamp rear face 11 inside of the combination lamp body 10, includes a turn lamp, a position lamp, and a cornering lamp, and is connected to electric wiring. The shaft arm 13 is provided at the inner end of the combination lamp rear face 11 in the vehicle width direction, extending inward at the vehicle rear in the vehicle width direction. The shaft 14 is provided at the tip of the shaft arm 13, extending vertically in a cylindrical form. The combination lamp lens 15 is made of permeable resin, covering the front face of the combination lamp rear face 11. The nut 16 is provided on the outer side of the combination lamp rear face 11 in the vehicle width direction, extending toward the rear.

The attachment member 20 includes a locking part (second engagement part) 21, a locking part 22, an attaching section 26, and an attaching screw 28. The attachment member 20, excluding the attaching screw 28, is integratedly formed made of resin. The locking part 21 is arranged on the locking part 22 on the rear side of the attachment member 20, and includes a square column 23, a front end 24, and locking claws 25. The square column 23 has an approximately square columnar shape, extending from the attachment member 20, inward at the vehicle rear in the vehicle width direction. The front end 24 is formed at the top of the square column 23, having an angular shape protruding at the center and extending from the four sides of the top of the square column 23 toward the protruding front end. The locking claws 25 are formed on the top and bottom of the square column 23, continuing from the angular front end 24, having an inclined plane gradually extending along the vertical width of the locking part 22 until the base end of the square column 23. A predetermined distance is set between the base end of the square column 23 and the respective locking claws 25. The attaching section 26 includes a screw hole 27, which is arranged below the locking part 22 and passes through the vehicle in the front-back direction. A screw shaft 29 of the attaching screw 28 is screwed into the screw hole 27. The screw shaft 29 is screwed together with the nut 16 in the combination lamp body 10 in front of the screw hole 27, fixing the attachment member 20 to the combination lamp body 10. A screw head 30 of the attaching screw 28 is arranged at a position which is visible when doors (omitted from the drawings), which are provided on either side of the vehicle 1 in the vehicle width direction facing the vehicle rear, are open, and which thus allows screw-together operation and screw release operation using a screwdriver pressed therein. The screw shaft 29 of the attaching screw 28 is screwed together with the nut 16 by making the screw head 30 rotate clockwise using the screwdriver while it is released from the nut 16 by making it rotate counterclockwise.

The bracket 40 is plate metal formed by press forming, and includes an engagement part (first engagement part) 41 and a headlamp body stationary portion 44. The engagement part 41 includes an engaging hole (engaging region) 42 and a through-hole (engagement release region) 43. The engaging hole 42 has an approximately square shape. The engaging hole 42 is engaged with the en locking part 21 of the attachment member 20 while the rear face of the engagement part 41 is in contact with the locking part 22 of the attachment member 20, and the front face thereof is latched by the locking claws 25 of the attachment member 20. Note that the thickness of the bracket 40 is much shorter than predetermined distance between the base end of the square column 23 of the locking part 21, which engages with the engaging hole 42, and the locking claws 25. The engaging hole 42 engages with the locking part 21 to regulate movement to the outer side and the rear of the combination lamp body 10 in the vehicle width direction. The through-hole 43 has an approximately rectangular shape having approximately the same lateral length as the engaging hole 42 and a longer longitudinal length than the maximum lateral width of the locking claws 25. The through-hole 43 is formed continuous from the engaging hole 42 in the front or direction intersecting with the protruding direction of the locking part 22, which engages with the engaging hole 42. Since the through-hole 43 has such a positional relationship with the engaging hole 42, the locking part 21 cannot move from the engaging hole 42 to the through-hole 43 while the combination lamp body 10 is attached to the vehicle body 2.

Each of the headlamp bodies 50 includes a headlamp rear face 51, a headlamp (omitted from the drawings), a support 53, a vertical support (omitted from the drawings), a guide piece 56, a headlamp lens 58, and a bracket joint 59, and is attached to the bracket 40. A headlamp socket 52 is integratedly formed on the headlamp rear face 51, which constitutes the rear face of the headlamp body 50. The headlamp is attached to the socket 52 on the headlamp rear face 51 inside of the headlamp body 50, and is connected to electric wiring. The support 53 has an approximately L-shaped cross section including a flat-plate first regulating portion 54 and a flat-plate second regulating portion 55, and is formed on the outer end of the headlamp rear face 51 in the vehicle width direction, extending vertically. The width direction of the first regulating portion 54 is set as the front-back direction, and width direction of the second regulating portion 55 is set as the vehicle width direction, where the second regulating portion 55 bends from the front end of the first regulating portion 54 outward in the vehicle width direction. The shaft 14 of the combination lamp body 10 is in contact with the outer surfaces of the first regulating portion 54 in the vehicle width direction, thereby regulating inward movement of the shaft 14. The shaft 14 of the combination lamp body 10 is in contact with the rear face of the second regulating portion 55, thereby regulating forward movement of the shaft 14. Namely, by the first regulating portion 54 and the second regulating portion 55 regulating inward and forward movements of the shaft 14 in the vehicle width direction, inward and forward movements of the combination lamp body 10 in the vehicle width direction are also regulated. The vertical supports are arranged on the upper and lower ends of the support 53. The vertical supports regulate vertical movement of the shaft 14 while the shaft 14 is in contact with the outer sides of the first regulating portion 54 in the vehicle width direction and the rear surface of the second regulating portion 55. This allows regulation of vertical movement of the combination lamp body 10. The guide piece 56 has a plate shape, and is arranged in the outer rear of the second regulating portion 55, facing the second regulating portion 55 and extending vertically. The width direction of the guide piece 56 is set to the vehicle width direction. A guiding portion 57, which extends slightly forward, is formed on the outer end of the guide piece 56 in the vehicle width direction. The inserting space for the shaft 14 is partitioned by the outer end of the guide piece 56 in the vehicle width direction and outer end of the second regulating portion 55 in the vehicle width direction. The headlamp lens 58 is made of permeable resin, covering the front face of the headlamp body 50. The headlamp lens 58 is arranged adjacent to the combination lamp lens 15. The bracket joint 59 is arranged in two, upper and lower places on the outer side of the headlamp body 50 in the vehicle width direction. Each of the bracket joints 59 is fixed to the headlamp body stationary portion 44 by bolts and nuts while the respective rear surfaces thereof are in contact with the front surface of the headlamp body stationary portion 44.

When attaching the combination lamp body 10 to the vehicle body 2, to begin with, the attaching screw 28 is screwed together to the nut 16 of the combination lamp body 10 to fix the attachment member 20. Next, the shaft 14 is inserted between the guide piece 56 and the second regulating portion 55 of the support 53 to make contact with the first regulating portion 54 and the second regulating portion 55. The outer end of the combination lamp body 10 in the vehicle width direction is then made to move with the shaft 14 as the center while the shaft 14 is in contact with the first regulating portion 54 and the second regulating portion 55. When the combination lamp body 10 reaches a predetermined position, the locking claws 25 of the locking part 21 of the attachment member 20 are bent and deformed to pass through the engaging hole 42 of the bracket 40, thereby engaging the engaging hole 42 and the engagement part 21.

Moreover, since the attachment member 20 is provided removable from the combination lamp body 10 by the attaching screw 28, removal of the attachment member 20 from the combination lamp body 10 allows removal of the combination lamp body 10 from the vehicle body 2. More specifically, first, the screw head 30 of the attaching screw 28 on the attachment member 20 is rotated counterclockwise by the screwdriver to release the attaching screw 28 screwed together to the nut 16 on the combination lamp body 10, and remove the attachment member 20 from the combination lamp body 10. At this time, since the screw head 30 of the attaching screw 28 is at the position reached by the tip of the screwdriver when the screwdriver is inserted while the adjacent door is open, workability at the time of removal is satisfactory. Next, since regulation of outward and backward movement in the vehicle width direction of the combination lamp body 10 removed from the attachment member 20 is released, the shaft 14 may be easily removed by pulling it out from between the guide piece 56 and the second regulating portion 55 of the support 53. In this state, the locking part 21 of the attachment member 20 is engaged with the engaging hole 42 of the bracket 40 on the vehicle body 2 side.

Note that in this state, the combination lamp body 10 may be reattached to the vehicle body 2. First, the shaft 14 of the combination lamp body 10 is made to be in contact with the support 53 of the headlamp body 50. Next, the combination lamp body 10 is rotated to the rear around the shaft 14 to screw together with the screw head 30 of the attaching screw 28 on the attachment member 20 using the screwdriver, thereby allowing reattachment of the combination lamp body 10.

Moreover, the attachment member 20 is not yet aligned with the bracket 40 when the attachment member 20 is removed from the combination lamp body 10. In other words, the locking part 21 is allowed to move from the engaging hole 42 to the through-hole 43 in the engagement part 41 of the bracket 40. Therefore, the locking part 21, which engages the engaging hole 42 of the bracket 40, along with the attachment member 20 is moved inward in the vehicle width direction when removing the attachment member 20. When the locking part 21 has been moved to the position of the through-hole 43, the engagement part 21 is pulled out from the through-hole 43 and the attachment member 20 is removed from the bracket 40.

With this structure, just by rotating and moving the combination lamp body 10 centered around the shaft 14, the locking part 21 is engaged with the hole 42 without particular necessity of positioning and thus the combination lamp body 10 is attached at a predetermined position of the vehicle body 2. As a result, the combination lamp body 10 may be easily attached.

Moreover, the combination lamp body 10 is positioned by the support 53 restricting its inward and forward movements along the vehicle width and by the engaging hole 42 restricting its outward and backward movements along the vehicle width. As a result, variation in attaching position of the combination lamp body 10 does not occur often, thereby providing satisfactory attachment precision.

Furthermore, since positioning the inner side and front of the combination lamp body 10 in the vehicle width direction within the inner side along the vehicle width adjacent to the headlamp bodies 50 is carried out, difference in outer edge position of the combination lamp lens 15 relative to outer edge of the headlamp lens 57 does not occur often, and thus the external appearance remains attractive.

Moreover, since movement of the locking part 21 of the attachment member 20 from the engaging hole 42 to the through-hole 43 is allowed if the attachment member 20 is removed from the combination lamp body 10 in order to remove the combination lamp body 10 from the vehicle body 2, the attachment member 20 may be removed from the bracket 40 by moving the attachment member 20 forward and moving the engagement part 21 from the engaging hole 42 to position of the through-hole 43. Therefore, the attachment member 20 removed once from the combination lamp body 10 may be easily reattached to the combination lamp body 10, and when reattaching the combination lamp body 10, it may be attached to the vehicle body 2 through the same procedure as when first attaching it thereto. In other words, just by rotating and moving the combination lamp body 10 centered around the shaft 14, the locking part 21 and the engaging hole 42 may be engaged without particular necessity of positioning, and the combination lamp body 10 may be easily reattached in the same manner as when first attaching it thereto.

Moreover, burden on the locking part 21 and the engaging hole 42 when removing the combination lamp body 10 from the vehicle body 2 may be suppressed to a minimum, and decrease in durability of the engagement part 21 and the engaging hole 42 may be prevented. Since removal is typically more difficult than attachment with a structure by which catching is carried out by a pin made of resin that is removable by being bent and deformed, a large burden is placed on the pin at the time of removal. Furthermore, since it has a form allowing removal even if removal is difficult, attachment thereof may not be strong. At the same time, with this embodiment, since the locking claws 25 of the engagement part 21 are not removed at the through-hole 42, a structure allowing stronger attachment is possible.

The present invention is not limited to this embodiment, and the form of the support 53, which supports the shaft 14, may be a cylinder with a part cut out with which the shaft 14 can be supported.

While the embodiment according to the invention devised by the inventor(s) has been described thus far, the present invention is not limited to the descriptions and drawings of this embodiment constituting a part of the disclosure of the present invention. Namely, it should be added that other embodiments, working examples, and operational technologies devised by person(s) skilled in the art according to this embodiment are all naturally included within the scope of this invention.

INDUSTRIAL APPLICABILITY

The present invention is applicable to various vehicles having a headlamp.

The invention claimed is:
1. An attachment structure for a combination lamp attachable at a predetermined position on the outer side of a pair of headlamps in the vehicle width direction, the headlamps arranged on the both sides of a vehicle body in the vehicle width direction, the attachment structure comprising:
  headlamp bodies, which are attached with the headlamps and are attachable to the vehicle body;

a combination lamp body, which is arranged adjacent to the headlamp bodies and attached with the combination lamp;

a shaft, which is provided on either an outer end of the headlamp bodies in the vehicle width direction or an inner end of the combination lamp body in the vehicle width direction;

a support, which is provided on either the other outer end of the headlamp bodies in the vehicle width direction or the other inner end of the combination lamp body in the vehicle width direction, and regulates inward and forward movements of the shaft in the vehicle width direction;

a first engagement part fixed to the vehicle body; and an attachment member, which is provided removable from the rear face of the combination lamp body and comprises a second engagement part that engages with the first engagement part, wherein while the outer ends of the combination lamp body are rotated and moved toward the rear centered around the shaft, which is regulated in movement by the support, and the combination lamp body reaches the predetermined position, the support regulates inward and forward movements of the combination lamp body in the vehicle width direction, and the first engagement part engages with the second engagement part to regulate outward and backward movements of the combination lamp body in the vehicle width direction.

2. The attachment structure for a combination lamp of claim 1, wherein either of the first or the second engagement part includes an engaging region and an engagement release region, the engaging region engages with the other of the either of the first or the second engagement part when the attachment member is rotated and moved in a predetermined direction centered around the shaft, and the engagement release region allows movement of the other engagement part from the engaging region due to movement of the attachment member in a direction intersecting with the predetermined direction, and allows disengagement of the other engagement part from the one engagement part.

* * * * *